(12) United States Patent
Bramlett et al.

(10) Patent No.: US 12,167,734 B2
(45) Date of Patent: Dec. 17, 2024

(54) SYSTEMS AND METHODS FOR ANTIMICROBIAL APPLICATION AND RELATED DATA COLLECTION

(71) Applicant: CMS Technology, Inc., Bridgewater, NJ (US)

(72) Inventors: Mark Bramlett, Bridgewater, NJ (US); Douglas Kroitsch, Bridgewater, NJ (US); Ingrid Cole, Bridgewater, NJ (US); James Dietrich, Bridgewater, NJ (US); Dale Morrow, Bridgewater, NJ (US); Neal Ervin, Bridgewater, NJ (US)

(73) Assignee: CMS TECHNOLOGY, LLC, Chicago, IL (US)

( * ) Notice: Subject to any disclaimer, the term of this patent is extended or adjusted under 35 U.S.C. 154(b) by 401 days.

(21) Appl. No.: 17/831,241

(22) Filed: Jun. 2, 2022

(65) Prior Publication Data

US 2022/0386631 A1 Dec. 8, 2022

Related U.S. Application Data

(60) Provisional application No. 63/195,822, filed on Jun. 2, 2021.

(51) Int. Cl.
*A22B 7/00* (2006.01)
*A22C 21/00* (2006.01)
(Continued)

(52) U.S. Cl.
CPC .......... *A22B 7/008* (2013.01); *A22C 21/0061* (2013.01); *A22C 21/06* (2013.01);
(Continued)

(58) Field of Classification Search
None
See application file for complete search history.

(56) References Cited

U.S. PATENT DOCUMENTS 6,233,966 B1 * 5/2001 Delpuech ................ G06M 7/04
62/374
9,289,001 B1 * 3/2016 Massey ................... G05B 15/02
(Continued)

OTHER PUBLICATIONS

International Search Report and Written Opinion mailed on Sep. 16, 2022, issued in corresponding International Application No. PCT/US2022/031970, filed on Jun. 2, 2022, 15 pages.

*Primary Examiner* — Dov Popovici
(74) *Attorney, Agent, or Firm* — CHRISTENSEN O'CONNOR JOHNSON KINDNESS PLLC (57) ABSTRACT

The systems and methods can include calculating a dwell time or density of workpieces in a vessel; and modulating the one or more conditions of the system based on the dwell time or density of workpieces in the vessel. In an example, the system includes a vessel configured to carry a working fluid and a plurality of workpieces at least partially submerged in the working fluid; a delivery train configured to introduce workpieces into the vessel; a first counting sensor configured to generate an entrance signal based upon a workpiece introduced into the vessel; a transport train configured to transport workpieces introduced into the vessel to an exit of the vessel; a removal train configured to remove workpieces from the vessel through the exit; and a second counting sensor configured to generate an exit signal based upon a workpiece removed from the vessel through the exit.

20 Claims, 4 Drawing Sheets

(51) Int. Cl.
*A22C 21/06* (2006.01)
*A23B 4/20* (2006.01)
*G01F 23/00* (2022.01)
*G01V 8/10* (2006.01)
*G05B 15/02* (2006.01)

(52) U.S. Cl.
CPC ............ *A23B 4/20* (2013.01); *G01F 23/0015* (2013.01); *G01V 8/10* (2013.01); *G05B 15/02* (2013.01)

(56) References Cited

U.S. PATENT DOCUMENTS

| | | |
|---|---|---|
| 10,368,556 B2 | 8/2019 | Massey |
| 10,701,948 B2 | 7/2020 | Massey |
| 11,213,040 B2 | 1/2022 | Yeaman |
| 2004/0067160 A1* | 4/2004 | Perkins .................... A23B 4/24 422/28 |

* cited by examiner

SYSTEMS AND METHODS FOR ANTIMICROBIAL APPLICATION AND RELATED DATA COLLECTION

CROSS-REFERENCE(S) TO RELATED APPLICATION(S)

This application claims the benefit of U.S. Provisional Application No. 63/195,822, filed Jun. 2, 2021, which is hereby incorporated by reference in its entirety.

TECHNICAL FIELD

The present disclosure relates to the field of automated systems for foodstuff disinfection.

BACKGROUND

Meats and produce can, depending on conditions, be contaminated with *Salmonella, Campylobacter* and/or *E. coli* as they are processed. To address this contamination, antimicrobial interventions can be used to reduce or even eliminate bacteria on the product and in the wash water. In addition to eliminating bacteria, product quality (e.g., color, texture, and retention of fat and inherent moisture) is also important to food processors.

To reduce or eliminate bacteria while attempting to ensure superior product quality, one should monitor and control multiple application parameters, as certain parameters change automated adjustments can be made to insure optimum performance. At present, however, there is no way to measure critical application parameters, automate control, and enhance total performance in an antimicrobial system. Accordingly, there is a long-felt need in the art for systems and methods for improved antimicrobial application and related data collection.

SUMMARY

The present disclosure generally relates to systems and methods for application of antimicrobial to food products and related data collection to address the above-noted and related challenges.

In an aspect, the present disclosure provides a system, such as a system for improved antimicrobial application and related data collection. In an embodiment, the system comprises a vessel configured to carry a working fluid and a plurality of workpieces at least partially submerged in the working fluid; a delivery train configured to introduce workpieces into the vessel; a first counting sensor configured to generate an entrance signal based upon a workpiece introduced into the vessel; a transport train configured to transport workpieces introduced into the vessel to an exit of the vessel; a removal train configured to remove workpieces from the vessel through the exit; a second counting sensor configured to generate an exit signal based upon a workpiece removed from the vessel through the exit; a sensor train configured to monitor one or more conditions of the system and provide a signal based on the one or more conditions; and a controller operatively coupled to the first counting sensor, the second counting sensor, and the sensor train, the controller including circuitry that, when executed by the controller, causes the system to perform operations including: counting, with first counting sensor, a number of workpieces entering the vessel based on the entrance signal; counting, with the second counting sensor, a number of workpieces exiting the vessel based on the exit signal; calculating a dwell time or density of workpieces in the vessel; and modulating the one or more conditions of the system based on the dwell time or density of workpieces in the vessel.

In another aspect, the present disclosure provides a method of operating a system, such as to provide improved antimicrobial application and related data collection. In an embodiment, the method comprises counting, with a first counting sensor, a number of workpieces entering a vessel configured to carry a working fluid and a plurality of workpieces at least partially submerged in the working fluid; counting, with a second counting sensor, a number of workpieces exiting the vessel; calculating a dwell time or density of workpieces in the vessel; and modulating one or more conditions of the system based on the dwell time or density of workpieces in the vessel.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present technology will become more readily appreciated as the same become better understood by reference to the following detailed description, when taken in conjunction with the accompanying drawings, wherein.

DETAILED DESCRIPTION

In various aspects, the present disclosure relates to systems and methods for antimicrobial application and related data collection. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

In certain embodiments, the systems and methods of the present disclosure include calculating a dwell time or density of workpieces in a vessel, such as a treatment vessel configured to carry a process fluid including an antimicrobial; and modulating one or more conditions of the system based on the dwell time or density of workpieces in the vessel. As discussed further herein, modulating the one or more conditions of the system based on the dwell time or density of workpieces in the vessel may be suitable to allow workpieces processed in the system to meet criteria for processing the workpieces, such as a workpiece temperature, workpiece bacterial load, and the like. Without such dwell time- or density-based modulation, a workpiece might exit the vessel having spent insufficient time therein or been treated in the vessel at a density too high to properly treat the workpiece such that, for example, a workpiece bacterial load or workpiece temperature exceeds important treatment criteria and milestones.

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints (e.g., "between 2 grams and 10 grams, and all the intermediate values includes 2 grams, 10 grams, and all intermediate values"). The endpoints of the ranges and any values disclosed herein are not limited to the precise range or value; they are sufficiently imprecise to include values approximating these ranges and/or values. All ranges are combinable.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4. Further, the term "comprising" should be understood as having its open-ended meaning of "including," but the term also includes the closed meaning of the term "consisting." For example, a composition that comprises components A and B may be a composition that includes A, B, and other components, but may also be a composition made of A and B only. Any documents cited herein are incorporated by reference in their entireties for any and all purposes.

Systems

In an aspect, the present disclosure provides a system, such as a system for improved antimicrobial application and related data collection. In an embodiment, the system comprises a vessel configured to carry a working fluid and a plurality of workpieces at least partially submerged in the working fluid; a delivery train configured to introduce workpieces into the vessel; a first counting sensor configured to generate an entrance signal based upon a workpiece introduced into the vessel; a transport train configured to transport workpieces introduced into the vessel to an exit of the vessel; a removal train configured to remove workpieces from the vessel through the exit; a second counting sensor configured to generate an exit signal based upon a workpiece removed from the vessel through the exit; a sensor train configured to monitor one or more conditions of the system and provide a signal based on the one or more conditions; and a controller operatively coupled to the first counting sensor, the second counting sensor, and the sensor train, the controller including circuitry that, when executed by the controller, causes the system to perform operations including: counting, with first counting sensor, a number of workpieces entering the vessel based on the entrance signal; counting, with the second counting sensor, a number of workpieces exiting the vessel based on the exit signal; calculating a dwell time or density of workpieces in the vessel; and modulating the one or more conditions of the system based on the dwell time or density of workpieces in the vessel.

In this regard, a system 100, in accordance with an embodiment of the present disclosure, will now be described with respect to FIG. 1. As shown, the system 100 includes a delivery train 102 configured to deliver or introduce a workpiece 103 to a vessel 108. A workpiece 103 can be, e.g., a whole animal, an animal part, a piece of fruit, a part of a piece of fruit, a vegetable, a piece of a vegetable, and the like. While certain Examples and embodiments of the present disclosure describe poultry carcasses, and, in certain embodiments, chicken carcasses, it will be understood that the systems and methods of the present disclosure are suitable for and configured to process other workpieces 103. In an embodiment, delivery train 102 comprises, e.g., shackles, hooks, paddles, augers, and the like, configured to deliver or introduce workpieces 103 into the vessel 108.

In the illustrated embodiment, system 100 is shown to include a removal element 106 configured to remove workpieces 103 from delivery train 102 and encourage the removed workpiece 103 into vessel 108 of the system 100. As shown, system 100 also includes a first counting sensor 104 (e.g., an optical sensor) that is configured to detect a workpiece 103 delivered to vessel 108. In an embodiment, the first counting sensor 104 configured to generate an entrance signal based upon a workpiece 103 introduced into the vessel 108. In this regard, the first counting sensor 104 can, thus, be used and/or configured to count the number of workpieces 103, such as by generating an entrance signal based upon a workpiece 103 introduced into the vessel 108, that are delivered as a function of time, e.g., 50 chickens in 60 minutes, thereby allowing a user (and the system 100) to monitor the influx of workpieces 103 into the system 100. In an embodiment, first counting sensor 104 is configured to count workpieces 103 that are not delivered to the system 100, e.g., a workpiece 103 that is not removed from delivery train 102 and/or a workpiece 103 that is rejected at the location of the vessel 108 entrance.

In an embodiment, the vessel 108 is, e.g., a tank, such as a semicylindrical tank. Other tank shapes (e.g., squared-off or rectangular) are also within the scope of the present disclosure. In an embodiment, the tank is open at the top, but this is not a requirement, as a tank can be enclosed (e.g., a cylindrical tank) and/or can include a lid that at least partially encloses the contents of the tank. In the illustrated embodiment, the vessel 108 includes a transport train 110 (e.g., a paddle or rocker) that encourages workpieces 103 delivered to vessel 108 toward an exit 122 of vessel 108. In some embodiments, vessel 108 can itself rock back and forth or otherwise oscillate to encourage the movement of workpieces 103 within the vessel 108.

In an embodiment, the vessel 108 can receive fluid from exterior to the vessel 108. As shown, vessel 108 is configured to receive fluid from a number of fluid sources. In the illustrated embodiment, the vessel 108 is configured to receive city or municipal water from a municipal water port 112 and/or chilled water port 114, respectively.

As shown, the system 100 includes a municipal water port 112 configured to place the vessel 108 in fluid communication with a municipal water source (not shown). Likewise, the system 100 is shown to include a chilled water port 114 configured to place the vessel 108 in fluid communication with a chilled water source (not shown). In this regard, the vessel 108 is configured to receive chilled and municipal water, such as to make up portions of the working fluid 128.

Further, the system 100 is shown to include an antimicrobial port 116 configured to place the vessel 108 in fluid communication with a source of antimicrobial 138. In this regard, the vessel 108 is configured to receive an antimicrobial, which microbial can be a peroxyacid, such as peracetic acid (PAA).

The flow rate through any one or more of municipal water port 112, chilled water port 114, and antimicrobial port 116 into vessel 108 can be modulated in a manual fashion (e.g., by a user) and/or in an automated fashion (e.g., by the system 100 itself), such as discussed further herein.

The working fluid 128 (within vessel 108) can comprise the antimicrobial along with water (chilled or otherwise). The working fluid 128 can, of course, include components in addition to the antimicrobial and water, such as those configured to adjust a pH of the working fluid 128.

As shown, the system 100 includes an air agitation feature 140, which air agitation feature 140 can be used to agitate the working fluid 128. Without being bound to any particular theory or embodiment, the agitation can act to prevent a thermal layer in the working fluid 128 or air within the vessel 108. Under certain circumstances, workpieces 103 delivered to vessel 108 could, without further intervention, accumulate at the top (or bottom) of vessel 108. By application of air agitation, such as with air agitation feature 140, workpieces 103 can be moved about within the working fluid 128, thereby more uniformly distributing them within the working fluid 128, which in turn gives rise to the workpieces 103 being more uniformly exposed to the working fluid 128. Also, without being bound to any particular theory or embodiment, the applied agitation can assist with massaging the working fluid 128 into the workpieces 103 themselves.

Figure 1:
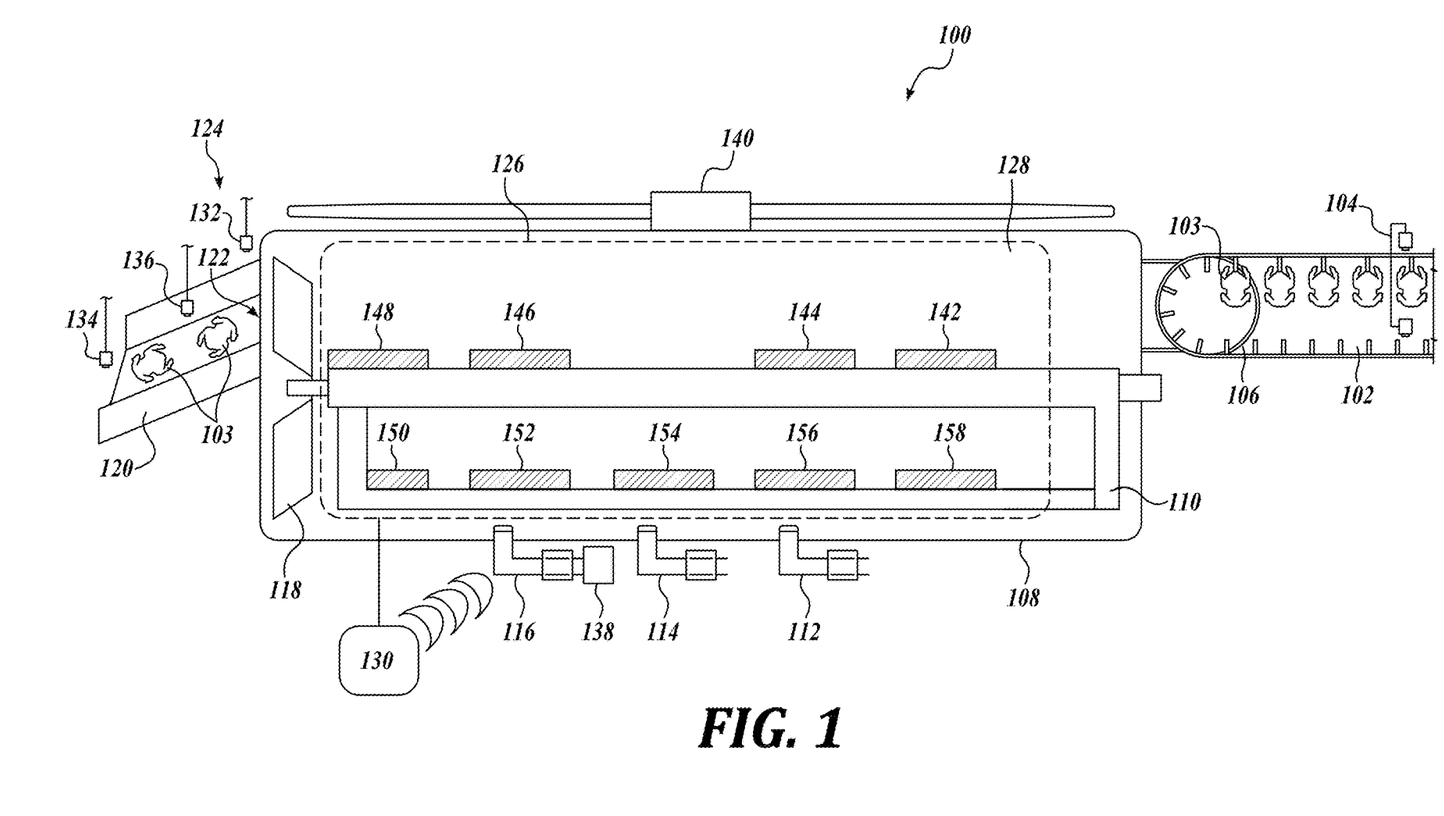
FIG. 1 is a schematic view of a system according to an embodiment of the present disclosure.

Also as shown in FIG. 1, system 100 includes a removal train 118 configured to encourage workpieces 103 from vessel 108, such as through an exit 122 of the vessel 108. In an embodiment, the removal train 118 is, e.g., a bladed or flighted component that extracts workpieces 103 from vessel 108, e.g., in the manner of an Archimedes-type screw pump. In an embodiment, the removal train 118 includes a component similarly shaped to a bladed fan configured to encourage workpieces from vessel 108. In an embodiment, the removal train 118 also includes a conveyor, a shackle line, and the like.

When removed, a workpiece 103 can be counted or otherwise analyzed by second counting sensor 124, which second counting sensor 124 can be configured to count the number of workpieces 103 that are removed as a function of time from vessel 108. In an embodiment, the second counting sensor 124 is configured to generate an exit signal based upon a workpiece 103 removed from the vessel 108 through the exit 122. In this way, the count of workpieces 103 entering vessel 108, such as counted by the first counting sensor 104, and the count of workpieces 103 leaving vessel 108, such as counted by the second counting sensor 124, can be used to determine a net accumulation (or a net reduction) of workpieces 103 within vessel 108 over time.

As shown in FIG. 1, the system 100 includes a sensor train 126 (illustrated as within the dashed line in FIG. 1) configured to monitor one or more conditions of the system 100 and provide one or more signals related to or based on the condition. In an embodiment, the sensor train 126 is configured to monitor one or more conditions of the system 100 and provide one or more signals based on the one or more conditions. In an embodiment, sensor train 126 is configured to monitor one or more of a number of conditions of the system 100. In the illustrated embodiment, the sensor train 126 includes a pH sensor 158 configured to measure pH of working fluid 128, a municipal water flow sensor 156 configured to measure flow of municipal water (e.g., in L) through the municipal water port 112, a chilled water flow sensor 154 configured to measure chilled water flow (e.g., in L) through the chilled water port 114, an antimicrobial flow sensor 152 configured measure flow of antimicrobial (e.g., in L) through the antimicrobial port 116, a rocker sensor 150 configured to provide a status of the transport train 110, an unloader rate sensor 148 configured to provide a status of removal train 118, an antimicrobial reuse sensor 146 configured to determine a level of reuse of antimicrobial (e.g., in L), a working fluid temperature sensor 144 configured to determine a temperature (e.g., in degrees Celsius) of the working fluid 128, a working fluid level sensor 142 configured to measure a level of working fluid 128 (e.g., in cm), an air agitation feature 140 configured to deliver air agitation and also determine a pressure (e.g., in PSI) of air agitation delivered to the working fluid 128 and a volume (e.g., in L) of air agitation delivered to working fluid 128, and the like.

The sensor train 126 can also be configured to detect one or more of: a fat content of a workpiece 103, a fat content of the working fluid 128, an organic load of a workpiece 103, an organic load of the working fluid 128, an amount of an organic material in the working fluid 128, a turbidity of the working fluid 128, an amount of the antimicrobial in the working fluid 128, a bacteria count of a workpiece 103, a bacteria count of the working fluid 128, a moisture content of a workpiece 103, a flow of water out of the vessel 108, a flow of working fluid 128 out of the vessel 108. As described elsewhere herein, any one or more of the foregoing can be used as a basis for modulating an operating condition of the system 100.

In the illustrated embodiment, the system 100 is shown to include a controller 130. As described further herein, the controller 130 is operatively coupled to various system 100 components, such as to exchange signals therebetween and to choreograph their operation. While a single controller 130 is illustrated in and described with respect to FIG. 1, it will be understood that the controller 130 can include one or multiple processors and/or can be part of a distributed system. In this regard, the controller 130 can be physically part of and/or coupled to the system 100. Likewise, in an embodiment, the controller 130 is not part of or coupled to the system 100 and is, in this embodiment, physically remote from the system 100, but nevertheless operatively coupled to one or more components of the system 100.

In an embodiment, the controller 130 is operatively coupled to the first counting sensor 104, the second counting sensor 124, and the sensor train 126, such as to exchange signals therebetween. As shown, the controller 130 is in electronic (and/or radio) communication with the first counting sensor 104, the second counting sensor 124, and the sensor train 126. In an embodiment, the controller 130 can be configured to, in response to one or more signals of sensor train 126, modulate one or more operations of system 100. Various logic modules of the controller 130 may be implemented in software/firmware executed on a general-purpose microprocessor, in hardware (e.g., application specific integrated circuit), or a combination of both.

In an embodiment, the controller 130 includes circuitry that, when executed by the controller 130, causes the system 100 to perform operations including counting, with first counting sensor 104, a number of workpieces 103 entering the vessel 108 based on the entrance signal; counting, with the second counting sensor 124, a number of workpieces 103 exiting the vessel 108 based on the exit signal.

As above, in an embodiment, the controller 130 is operatively coupled to the first counting sensor 104 and the second counting sensor 124. As also described further herein, in an embodiment, the controller 130 includes circuitry that, when executed by the controller 130, causes the system 100 to perform operations including counting, with first counting sensor 104, a number of workpieces 103 entering the vessel 108, such as based on the entrance signal; and counting, with the second counting sensor 124, a number of workpieces 103 exiting the vessel 108, such as based on the exit signal.

In an embodiment, and as discussed further herein with respect to the Examples of the present disclosure, the system 100 is configured to count a number of workpieces 103 entering and/or exiting portions of the system 100, such as the vessel 108, through image processing including so-called blob analysis. Accordingly, in an embodiment, the controller 130 includes circuitry to define signals generated by imaging devices of the counting sensors, such as counting sensors 104 and 124, as corresponding to portions of a scene either including or not including a workpiece 103, such as through binarization of the image and setting a greyscale threshold to define each pixel as black (i.e., corresponding to a portion of the image not containing a workpiece 103) or white (i.e., corresponding to a portion of the image containing a workpiece 103).

In this regard, still referring to FIG. 1, the second counting sensor 124 includes an imaging device 132 positioned to image the exit 122, wherein the exit signal comprises signal from a plurality of pixels of the imaging device 132, and wherein counting, with the second counting sensor 124, a number of workpieces 103 exiting the vessel 108 based on the exit signal comprises defining signal from pixels of the plurality of pixels as either empty signal corresponding to a portion of the exit 122 not including a workpiece 103 or workpiece signal corresponding to a portion of the exit 122 including a workpiece 103 based on a greyscale threshold; summing an area of the exit 122 occupied by workpieces 103 based on the workpiece signal; and dividing the area of the exit 122 occupied by workpieces 103 by an average workpiece 103 area to provide an average workpiece 103 number.

In an embodiment, the system 100 is configured to perform line scan imaging, such as discussed further herein with respect to Example 3. Accordingly, still referring to FIG. 1, the second counting sensor 124 is shown comprise an exit sensor 136 configured to generate a batch signal when a last workpiece 103 of the number of workpieces 103 exits the exit 122; and a chute sensor configured to generate a chute exit signal when a workpiece 103 exits a chute 120 positioned to receive workpieces 103 from the exit 122; wherein the imaging device 132 is a line scan camera positioned to image workpieces 103 on the chute 120. In an embodiment, the controller 130 further includes circuitry that, when executed by the controller 130, causes the system 100 to perform operations including generating, with the line scan camera, a plurality of line scan images starting upon receipt of the chute exit signal and ending upon receipt of the batch signal; and compiling the plurality of line scan images to provide the exit signal.

Still referring to FIG. 1, in an embodiment, the imaging device 132 is a first imaging device 132 positioned to image the exit 122 and a chute 120 positioned to receive workpieces 103 from the exit 122, and wherein the second counting sensor 124 further comprises second imaging device 134 positioned to image a chute 120 exit. In such an embodiment, the controller 130 may further include circuitry that, when executed by the controller 130, causes the system 100 to perform operations including generating a first image, with the first imaging device 132, of workpieces 103 in the chute 120; and generating a second image, with the second imaging device 134, of workpieces 103 in the chute 120 exit; and combining the first image and the second image to provide a combined image. As discussed further herein with respect to Example 2, counting, with the second counting sensor 124, a number of workpieces 103 exiting the vessel 108 is based on the exit signal comprises counting a number workpieces 103 in the combined image.

In an embodiment, such counts of workpieces 103 entering and exiting the vessel 108 can be used to determine a number of workpieces 103 present in the vessel 108 as a function of time. Accordingly, in an embodiment, the controller 130 includes circuitry that, when executed by the controller 130, causes the system 100 to perform operations including calculating a dwell time or density of workpieces 103 in the vessel 108, such as based on a number of workpieces 103 present in the vessel 108 as a function of time.

In an embodiment, the dwell time is based on an average or a measured time a workpiece 103 is in the vessel 108. As used herein, a dwell time refers to a time, such as an average or measured time, a workpiece 103 is in the vessel 108. As an example, a system 100 can derive dwell time based on number of products in the vessel 108 divided by the speed at which they are removed until empty, e.g., 1000 products/100 products removed per minute=dwell time of 10 minutes.

Such a dwell time is in contrast to and distinct from a workload of the system 100 as a whole, which may be determined by a number of workpieces 103 entering the system 100 and exiting the system 100 in a given time. In this regard, a dwell time refers to a time, whether average or measured, that a workpiece 103 is in the vessel 108, such as in the working fluid 128 of the vessel 108, whereas a workload merely refers to a number of workpieces 103 processed by a system 100 without providing information as to time a workpiece 103 spent in a treatment vessel 108.

In an embodiment, the workpiece 103 density is based on an average or a measured number of workpieces 103 in the vessel 108 and a volume of the working fluid 128, such as may be altered over a period of time. In the case of poultry and a chiller application, the system 100 can measure the incoming and outgoing load and calculate a bird density (within the system 100) based on the size of the chiller and/or volume of the working fluid 128 disposed in the vessel 108. Other performance parameters can also be adjusted to optimize both antimicrobial and product quality performance for the workpiece 103 density.

In an embodiment, the controller 130 includes circuitry that, when executed by the controller 130, causes the system 100 to perform operations including modulating the one or more conditions of the system 100 based on the dwell time or density of workpieces 103 in the vessel 108. By adjusting the inflow and outflow of workpieces 103, the system 100 can ensure that workpieces 103 within the system 100 experience a suitable dwell time, which dwell time allows for the workpieces 103 to meet any temperature regulations (e.g., a bird must attain a temperature of 40 degrees within 4 hours of the bird's killing) as well as for the workpieces 103 to meet other criteria, such as bacterial load.

As discussed further herein, the controller 130 includes circuitry that, when executed by the controller 130, causes the system 100 to perform operations including modulating the one or more conditions of the system 100, such as based on the dwell time or density of workpieces 103 in the vessel 108. A non-exhaustive listing of the one or more conditions of the system 100 includes, inter alia, a rate of workpiece 103 delivery to the vessel 108, a rate of workpiece 103 exit from the vessel 108, a temperature of the working fluid 128 within the vessel 108, a temperature of a workpiece 103, a volume of the working fluid 128 within the vessel 108, a depth of the working fluid 128 within the vessel 108, a pH of the working fluid 128 within the vessel 108, a flow of water into the vessel 108, a number of workpieces 103 within the vessel 108, a fat content of a workpiece 103, a fat content of the working fluid 128, an organic load of a workpiece 103, an organic load of the working fluid 128, an amount of an organic material in the working fluid 128, a turbidity of the working fluid 128, an amount of the antimicrobial in the working fluid 128, a bacteria count of a workpiece 103, a bacteria count of the working fluid 128, a moisture content of a workpiece 103, a flow of water out of the vessel 108, a flow of working fluid 128 out of the vessel 108, and any combination thereof.

In an embodiment, modulating the one or more conditions of the system 100 is selected from one or more of (1) modulating operation of the delivery train 102, (2) modulating operation of the transport train 110, (3) modulating operation of the removal train 118, (4) modulating an amount of the working fluid 128 within the vessel 108, (5) modulating a flow of chilled water to the vessel 108, (6) modulating a flow of municipal water to the vessel 108, (7) modulating a flow of an antimicrobial to the vessel 108, (8) modulating a temperature of the working fluid 128 within the vessel 108, and (9) modulating a pH of the working fluid 128 within the vessel 108.

A non-limiting discussion of system 100 conditions and their modulation will now be described.

Make-Up Water.

In an embodiment, the system 100 is configured to modulate the inflow of make-up water, where such make-up water. During processing, water can become saturated with organic material. There thus exists a need to remove at least some processing water and add additional water (city or chilled) to reduce the organic material in the processing water. Determining and controlling levels of organic material has bearing on pathogen reduction and product quality and can also improve water conservation. In an embodiment, the system 100 is configured to modulate inflow of make-up water when a workpiece 103 dwell time or density is outside of a predetermined range.

Temperature and/or pH.

In an embodiment, the one or more conditions of the system 100 comprises a temperature of the working fluid 128 of the system 100 or a pH of the working fluid 128 of the system 100. In an embodiment, the system 100 is configured to modulate temperature and/or pH, as these variables can influence antimicrobial performance and product quality. In an embodiment, the system 100 is configured to modulate the temperature and/or pH of the working fluid 128 when the workpiece 103 dwell time or density is outside of a predetermined level. Accordingly, in an embodiment, the controller 130 further includes circuitry that, when executed by the controller 130, causes the system 100 to perform operations including modulating one or more operations of the system 100 when the temperature of the working fluid 128 lies outside a predetermined range. Likewise, in an embodiment, in an embodiment, the controller 130 further includes circuitry that, when executed by the controller 130, causes the system 100 to perform operations including modulating one or more operations of the system 100 when the pH of the working fluid 128 lies outside a predetermined range. pH can be measured and adjusted, as needed, by addition of a pH control agent and/or incoming water source. The water temperature can also be measured and linked to water dumping/overflow and dosing with either city or chilled water to maintain a target temperature. In an embodiment, the system 100 can be configured to modulate the flow of antimicrobial, city water, and/or chilled water to achieve a desired temperature.

Working Fluid Level.

In an embodiment, the system 100 is configured to modulate the level of working fluid 128 in the vessel 108. Without being bound to any particular theory, the level of working fluid 128 can be set so as to allow for immersion of workpieces 103, such as based an actual or measured number of workpieces 103 or an estimated or average number of workpieces 103 in the vessel. In an embodiment, the system 100 is configured to modulate working fluid 128 level in the vessel 108 based on measured or average workpiece 103 dwell time or density, such as when the workpiece 103 dwell time or density is outside of a predetermined range.

The level of working fluid 128 can be adjusted further for performance and water conservation.

Agitation.

In an embodiment, the system 100 is configured to modulate a degree of agitation, as well as the type of agitation that is provided within the system 100, such as with agitator 140. Agitation can be modulated and adjusted to achieve antimicrobial performance and product quality. As but one example, if workpieces 103 (also termed "product") leaving the vessel 108 are found to exhibit microbial loads that are higher than desired, a system 100 can increase the level of agitation within the system 100 to effect more vigorous application of the antimicrobial working fluid 128 to the workpieces 103 in the system 100, which more vigorous application can in turn give rise to increased antimicrobial performance within the working fluid 128. Additionally, if workpiece 103 dwell time or density are outside of a predetermined range, the system 100 may be configured to increase or decrease an amount or type of agitation applied to the working fluid 128.

Antimicrobial.

In an embodiment, the system 100 is configured to modulate the concentration of the antimicrobial in the working fluid 128, where antimicrobial concentration can be measured via a sensor or proportional flow control at the application point. Adjustments with incoming water or antimicrobial can also be made to optimize performance based on other measured parameters (product density, temperature, organic load, turbidity, and the like).

As discussed further herein, in an embodiment, the system 100 includes a source of an antimicrobial 138 in fluid communication with the interior of the vessel 108, such as through antimicrobial port 116. In an additional embodiment, the controller 130 further includes circuitry that, when executed by the controller 130, causes the system 100 to perform operations including modulating flow of the antimicrobial into the vessel 108 based on the dwell time or density of workpieces 103 in the vessel 108. In this regard, as workpiece 103 density, for example, exceeds a predetermined range, the system 100 may be configured to increase a concentration of antimicrobial in order to compensate for an otherwise higher than acceptable workpiece 103 density. Likewise, in an embodiment, when workpiece 103 dwell time falls below a predetermined range or level, an amount of antimicrobial can be added to the working fluid 128 to compensate for an otherwise lower than acceptable workpiece 103 dwell time.

Turbidity and/or Oxygen Content.

As described elsewhere herein, the turbidity and/or oxygen content of the working fluid 128 can be monitored. Without being bound to any particular theory, these can be indicative of organic load. If one or more of these measurements exceeds a threshold level, the system 100 can in response dump excess water and add make-up water to reduce the turbidity and/or oxygen content of the working fluid 128.

Unloading.

The system 100 can also monitor the operation of the removal or unloader train 118, such as with the second counting sensor 124. As explained elsewhere herein, unloader rate alone or in combination with the rate of incoming product can be used to modulate workpiece 103 dwell time and/or workpiece 103 density. For example, if the rate of outgoing workpieces 103 greatly exceeds the rate of incoming workpieces 103, the outgoing workpieces 103 may not have experienced a sufficient dwell time in the working fluid 128. As a result, the system 100 can reduce the rate at which workpieces 103 are removed from the vessel 108, which reduced removal rate in turn gives rise to a longer dwell time. Likewise, if the rate of incoming product greatly exceeds the rate of outgoing product, the workpiece 103 density may exceed a predetermined level or range. In this regard, in an embodiment, the system 100 is configured to modulate a rate at which workpiece 103 are introduced that more closely matches the rate at which workpieces 103 exit the vessel 108, such as with the delivery train 102, to provide a lower workpiece 103 density.

Fluid Re-Use.

In an embodiment, the system 100 is configured to capture and reuse working fluid 128 upstream in the process. This working fluid 128 can be taken from the application point and directed upstream or the application point could be the recipient of the reused water. In both cases, the system 100 can adjust control parameters such as the amount, flow (incoming/outgoing) concentration, temperature, and pH to enhance performance.

Downtime/Breaktime.

During shift changes or breaks, a user may desire that no workpieces 103 are introduced to the system 100. In this regard, in an embodiment, the system 100 is configured to detect idle time (and/or operate on a schedule) and make appropriate adjustments to effect proper treatment of workpieces 103 that is in-process at that time. In an embodiment, the system 100 is configured to execute a re-start sequence of operations (e.g., increased flow of antimicrobial, decreased flow of antimicrobial) when operations resume following downtime. In an embodiment, the system 100 is configured to effect water reuse during such shifts and break times. In an embodiment, the system 100 includes feedback features (e.g., alarms) to advise the user when a given parameter (e.g., turbidity) is out of specification.

Data Analytics.

In an embodiment, the system 100 includes data analytics software or circuitry that identifies operational settings that give rise to desired or even optimal performance. These settings can be identified based on data collected for a user's specific equipment and product type. A data analytics package can identify the dependent variables and automate the adjustments, such as to implement the identified variables. Such a package can also provide real-time information as well as hold historical data and measurements.

Methods

In another aspect, the present disclosure provides a method of operating a system, such as to provide improved antimicrobial application and related data collection.

Figure 2:
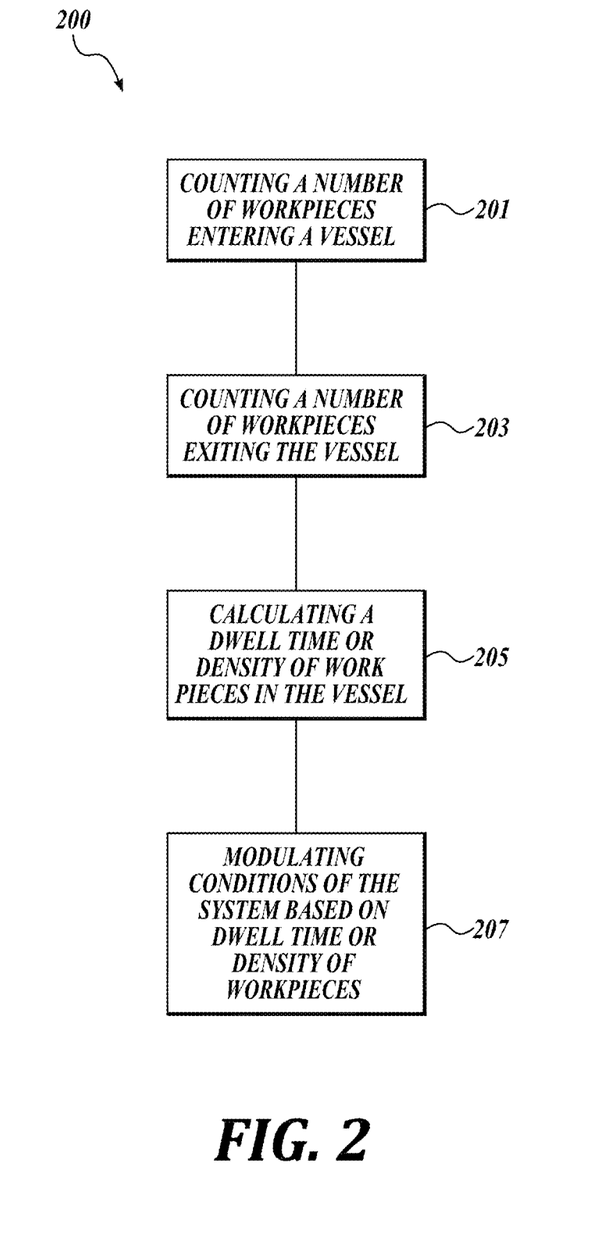
FIG. 2 is a block diagram of a method according to an embodiment of the present disclosure.

In this regard, attention is directed to FIG. 2 in which a block diagram of a method 200 according to an embodiment of the present disclosure is illustrated. In an embodiment, method 200 is a method for operating a system according to an embodiment of the present disclosure, such the system 100 discussed further herein with respect to FIG. 1.

In an embodiment, method 200 begins with process block 201, which includes counting, such as with a first counting sensor, a number of workpieces entering a vessel. As discussed further herein, in an embodiment, the vessel is configured to carry a working fluid and a plurality of workpieces at least partially submerged in the working fluid, where such a working fluid can contain, for example, an antimicrobial.

As also discussed further herein, a workpiece can be, e.g., a whole animal, an animal part, a piece of fruit, a part of a piece of fruit, a vegetable, a piece of a vegetable, and the like. While the present disclosure describes poultry carcasses, and, in certain embodiments, chicken carcasses, it will be understood that the methods of the present disclosure are suitable for and configured to process other workpieces, such as to reduce or eliminate microbial contamination thereon and/or therein.

In an embodiment, process block 201 is followed by process block 203, which includes counting, such as with a second counting sensor, a number of workpieces 103 exiting the vessel.

In an embodiment, the second counting sensor comprises an imaging device positioned to image the exit. In an embodiment, the second counting sensor generates an exit signal based upon a workpiece removed from the vessel through the exit, wherein the exit signal comprises signal from a plurality of pixels of the imaging device. In an embodiment, counting, with the second counting sensor, a number of workpieces exiting the vessel based on the exit signal comprises defining signal from pixels of the plurality of pixels as either empty signal corresponding to a portion of the exit not including a workpiece or workpiece signal corresponding to a portion of the exit including a workpiece based on a greyscale threshold; summing an area of the exit occupied by workpieces based on the workpiece signal; and dividing the area of the exit occupied by workpieces by an average workpiece area to provide an average workpiece number.

In certain embodiments, workpieces exit the vessel in groups or batches, such as when a removal train urges a group of workpieces from the vessel through the exit and onto a chute. Accordingly, in an embodiment, the second counting sensor further comprises: an exit sensor configured to generate batch signal when a last workpiece of the number of workpieces exits the exit; and a chute sensor configured to generate a chute exit signal when a workpiece exits a chute positioned to receive workpieces from the exit; wherein the imaging device is a line scan camera positioned to image workpieces on the chute. In an embodiment, counting, with the second counting sensor, a number of workpieces exiting the vessel based on the exit signal comprises generating, with the line scan camera, a plurality of line scan images starting upon receipt of the chute exit signal and ending upon receipt of the batch signal; and compiling the plurality of line scan images to provide the exit signal.

In an embodiment, the imaging device is a first imaging device positioned to image the exit and a chute positioned to receive workpieces from the exit, and the second counting sensor further comprises second imaging device positioned to image a chute exit. In an embodiment, counting, with the second counting sensor, a number of workpieces exiting the vessel based on the exit signal comprises generating a first image, with the first imaging device, of workpieces in the chute; and generating a second image, with the second imaging device, of workpieces in the chute exit; and combining the first image and the second image to provide a combined image. In an embodiment, counting, with the second counting sensor, a number of workpieces exiting the vessel based on the exit signal comprises counting a number workpieces in the combined image.

In an embodiment, process block 203 is followed by process block 205, which includes calculating a dwell time or density of workpieces in the vessel. In an embodiment, the dwell time is based on an average or a measured time a workpiece is in the vessel. In an embodiment, the workpiece density is based on an average or a measured number of workpieces in the vessel and a volume of the working fluid.

In an embodiment, process block 205 is followed by process block 207, which includes modulating one or more conditions of the system based on the dwell time or density of workpieces in the vessel.

In an embodiment, modulating the one or more conditions of the system is made without intervention by a user, such as automatically. In this regard, in an embodiment, modulating the one or more conditions occurs automatically, such as through a function of the system, when the workpiece dwell time or the workpiece density is outside of a predetermined range or above or below a predetermined level. In an embodiment, modulating the one or more conditions is, at least in part, as a result of a user input or intervention.

In an embodiment, wherein modulating the one or more conditions of the system is selected from one or more of (1) modulating operation of the delivery train, (2) modulating operation of the transport train 110, (3) modulating operation of the removal train, (4) modulating an amount of the working fluid within the vessel, (5) modulating a flow of chilled water to the vessel, (6) modulating a flow of municipal water to the vessel, (7) modulating a flow of an antimicrobial to the vessel, (8) modulating a temperature of the working fluid within the vessel, and (9) modulating a pH of the working fluid within the vessel.

In an embodiment, wherein the one or more conditions of the system is selected from the group consisting of a rate of workpiece delivery to the vessel, a rate of workpiece exit from the vessel, a temperature of the working fluid within the vessel, a temperature of a workpiece, a volume of the working fluid within the vessel, a pH of the working fluid within the vessel, a flow of water into the vessel, a number of workpieces within the vessel, a fat content of a workpiece, a fat content of the working fluid, an organic load of a workpiece, an organic load of the working fluid, an amount of an organic material in the working fluid, a turbidity of the working fluid, an amount of the antimicrobial in the working fluid, a bacteria count of a workpiece, a bacteria count of the working fluid, a moisture content of a workpiece, a flow of water out of the vessel, a flow of working fluid out of the vessel, and any combination thereof.

In an embodiment, the one or more conditions of the system comprises a temperature of the working fluid of the system. In an embodiment, modulating one or more operations of the system includes modulating one or more operations of the system when the temperature of the working fluid lies outside a predetermined range. Such modulation can include, for example, addition of chilled water to the vessel to lower a temperature of the working fluid disposed therein.

In an embodiment, the one or more conditions of the system comprises a temperature of a workpiece. In an embodiment, modulating one or more operations of the system includes modulating one or more operations of the system when the temperature of the workpiece lies outside a predetermined range. Such modulation can include, for example, addition of chilled water to the vessel to lower a temperature of the working fluid disposed therein, thereby lowering a temperature of the workpiece.

In an embodiment, the one or more conditions of the system comprises a level or concentration of an antimicrobial in the vessel and modulating one or more conditions of the system includes modulating flow of the antimicrobial into the vessel based on the dwell time or density of workpieces in the vessel.

The order in which some or all of the process blocks appear in each process should not be deemed limiting. Rather, one of ordinary skill in the art having the benefit of the present disclosure will understand that some of the process blocks may be executed in a variety of orders not illustrated, or even in parallel.

Some processes explained above are described in terms of computer software and hardware. The techniques described may constitute machine-executable instructions embodied within a tangible or non-transitory machine (e.g., computer) readable storage medium, that when executed by a machine will cause the machine to perform the operations described. In an aspect, the present disclosure provides non-transitory, machine-readable storage media for performing one or more methods of the present disclosure, such as with one or more of the systems of the present disclosure. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

EXAMPLES

Example 1: Imaging and Counting Poultry Carcasses

The present Example demonstrates imaging and counting poultry carcasses with systems and methods according to embodiments of the present disclosure, which include blob analysis.

Equipment used for this Example included:
5 Mpx GigE camera with Sony IMX 267 sensor.
Balser hi-resolution 8 mm lens.
Two high power red LED ring lights.
Two high power white LED flood/work lights.
Matrox 4SightGPM vision controller with Design Assistant software.

A camera and ring lights were mounted above the chute aimed down towards the chute at a slight angle to mitigate reflections. The camera was about 6 feet above the chute, keeping the entire chute and paddle in the Field of View. The white LED flood lights were positioned ahead of the chute at a relatively steep angle in order to wash the entire chute with even lighting and reduce or eliminate reflections, glare, and hot spots. The stainless-steel chute is highly reflective, so care was taken to avoid the glare and hot spots. A Matrox Design Assistant program was written to allow for manual capture of images as birds are transferring from the lifting paddle down the chute. The program includes the ability to adjust camera exposure level and greyscale threshold levels. A total of 2,544 images were captured at four different exposure levels. These images were used to test a variety of image processing techniques to assess the feasibility of using vision technology for counting birds on the chute. After testing several image processing techniques, a Blob Analysis tool was achieving diagnostic and consistent results.

The process of using Blob Analysis utilizes binarization of the image and setting a greyscale threshold (between 0-255) to define each pixel as black (i.e., corresponding to a portion of the image not containing a bird) or white (i.e., corresponding to a portion of the image containing a bird). This threshold was set such that the area of an average size bird is represented by a group of contiguous white pixels. The total area of white pixels in an image are then added together and divided by a factor representing the area of a single average sized bird resulting in the approximate number of birds on the chute.

The program written for testing the images produced a calculated value representing the number of birds on the chute. Each image was also manually inspected to count the actual number of birds in each image. While processing the test images, an actual "manual" count of birds was logged and compared to the programs calculated count. The calculated count of birds was very similar to or coinciding with the manual count. All these values were tallied while evaluating the images.

Figure 3A:
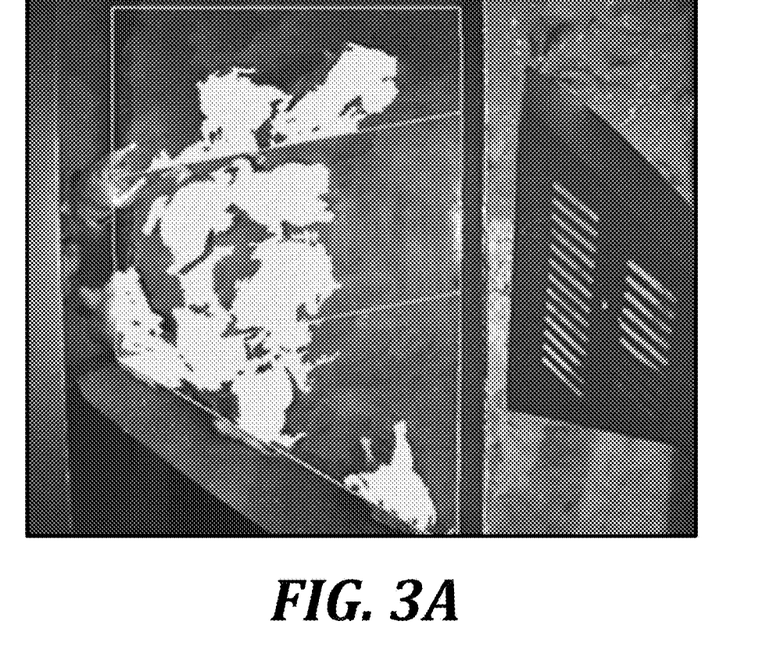
FIG. 3A is a binarized image of a chute containing workpieces, in accordance with an embodiment of the present disclosure.
Figure 3B:
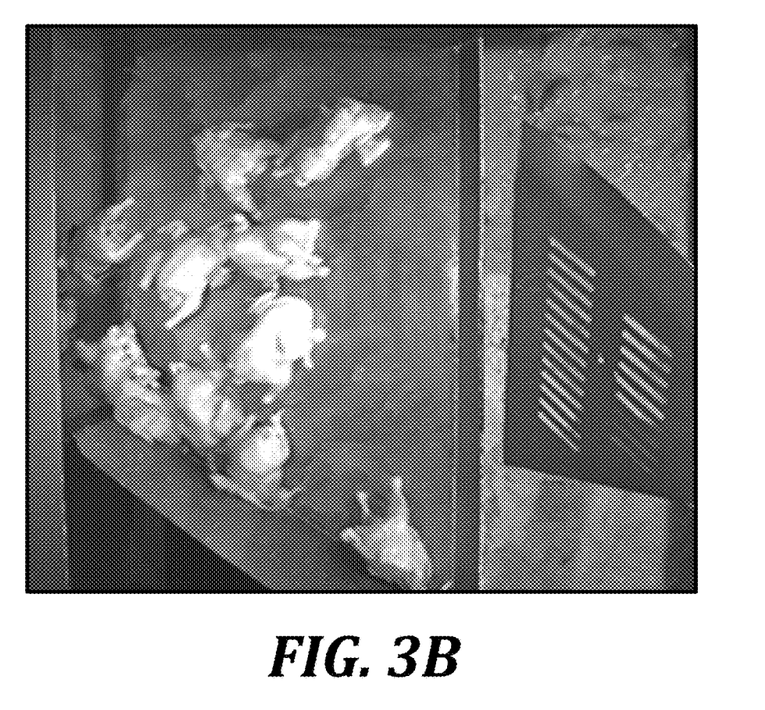
FIG. 3B is an unprocessed image of the chute from FIG. 3A, in accordance with an embodiment of the present disclosure.
Figure 3C:
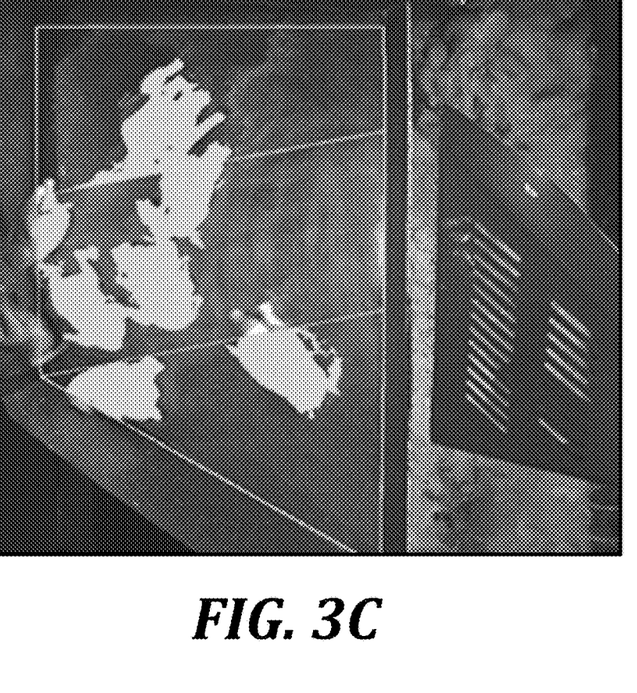
FIG. 3C is a binarized image of a chute containing workpieces, in accordance with an embodiment of the present disclosure.
Figure 3D:
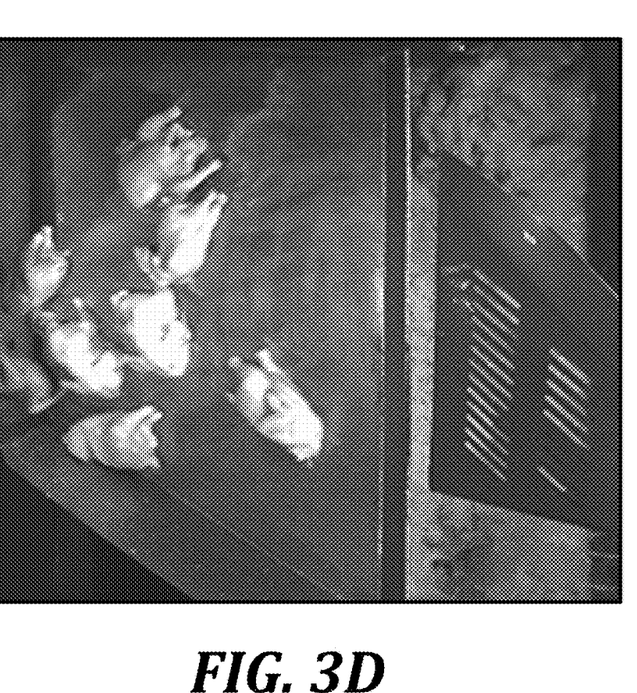
FIG. 3D is an unprocessed image of the chute from FIG. 3C, in accordance with an embodiment of the present disclosure.

FIGS. 3A and 3C are binarized images of chutes containing workpieces, here chicken carcasses, in accordance with an embodiment of the present disclosure. FIGS. 3B and 3D are unprocessed images of the chutes from FIGS. 3A and 3C.

As shown, the binarized images of FIGS. 3A and 3C are divided into multiple regions, here three regions. In use, the system binarizes the regions of the image that are inspected to provide white, or occupied regions, and black, or unoccupied regions, and then divides the total number of occupied pixels from the multiple regions by a number pixels corresponding to an average size of a workpiece. This provides an estimated number of workpieces in the binarized image at the time the image was obtained.

Results

The result using 753 images obtained at the same exposure level yielded 111 bird over-count, and 126 bird under-count or a delta of 15 birds less than the actual manual count, about a 2% error.

This technique, using Blob Analysis, provides a viable method of counting the approximate number of birds traveling down the chute.

Example 2: Multiple Image Capture

The present Example describes using the Blob Analysis technique described with respect to Example 1, with appropriate camera triggers to capture two independent images of birds coming down the chute.

The first image is obtained from a region of interest towards a lower section of the chute to count the first couple birds that are released early and then a second image with a region of interest including the entire chute and paddle to capture the rest of the birds.

Example 3: Line Scan Camera

The present Example relates to using a line scan camera to build an image for analysis using the Blob technique described further herein with respect to Example 1. According to this approach, a sensor is positioned to sense whether an object, such as a poultry carcass passes through the bottom of the chute to "trigger" the start of building a frame and a second sensor or encoder signal to indicate the position of the paddle where all birds are off the paddle. This indicates an "End of Frame" when the image is then handed off for processing the bird count while the next image is being built.

Example 4: Deep Learning and Artificial Intelligences

This Example describes using a convolutional neural network and deep learning algorithms to teach the system what a bird looks like. The counting process then takes place like a conventional pattern matching technique.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system comprising:
   a vessel configured to carry a working fluid and a plurality of workpieces at least partially submerged in the working fluid;
   a delivery train configured to introduce workpieces into the vessel;
   a first counting sensor configured to generate an entrance signal based upon a workpiece introduced into the vessel;
   a transport train configured to transport workpieces introduced into the vessel to an exit of the vessel;
   a removal train configured to remove workpieces from the vessel through the exit;
   a second counting sensor configured to generate an exit signal based upon a workpiece removed from the vessel through the exit;
   a sensor train configured to monitor one or more conditions of the system and provide a signal based on the one or more conditions; and
   a controller operatively coupled to the first counting sensor, the second counting sensor, and the sensor train, the controller including circuitry that, when executed by the controller, causes the system to perform operations including:
      counting, with the first counting sensor, a number of workpieces entering the vessel based on the entrance signal;
      counting, with the second counting sensor, a number of workpieces exiting the vessel based on the exit signal;
      calculating a dwell time or density of workpieces in the vessel; and
      modulating the one or more conditions of the system based on the dwell time or the density of workpieces in the vessel.

2. The system of claim 1, wherein the dwell time is based on an average or a measured time a workpiece is in the vessel.

3. The system of claim 1, wherein the density of workpieces is based on an average or a measured number of workpieces in the vessel and a volume of the working fluid.

4. The system of claim 1 wherein modulating the one or more conditions of the system comprises modulating the one or more conditions of the system when the dwell time or the density of workpieces in the vessel is outside of a predetermined range.

5. The system of claim 1, wherein modulating the one or more conditions of the system is selected from one or more of (1) modulating operation of the delivery train, (2) modulating operation of the transport train, (3) modulating operation of the removal train, (4) modulating an amount of the working fluid within the vessel, (5) modulating a flow of chilled water to the vessel, (6) modulating a flow of municipal water to the vessel, (7) modulating a flow of an antimicrobial to the vessel, (8) modulating a temperature of the working fluid within the vessel, and (9) modulating a pH of the working fluid within the vessel.

6. The system of claim 1, wherein the one or more conditions of the system is selected from a group consisting of a rate of workpiece delivery to the vessel, a rate of workpiece exit from the vessel, a temperature of the working fluid within the vessel, a temperature of a workpiece, a volume of the working fluid within the vessel, a pH of the working fluid within the vessel, a flow of water into the vessel, a number of workpieces within the vessel, a fat content of a workpiece, a fat content of the working fluid, an organic load of a workpiece, an organic load of the working fluid, an amount of an organic material in the working fluid, a turbidity of the working fluid, an amount of an antimicrobial in the working fluid, a bacteria count of a workpiece, a bacteria count of the working fluid, a moisture content of a workpiece, a flow of water out of the vessel, a flow of working fluid out of the vessel, and any combination thereof.

7. The system of claim 1, wherein the second counting sensor comprises an imaging device positioned to image the exit, wherein the exit signal comprises signal from a plurality of pixels of the imaging device, and wherein counting, with the second counting sensor, a number of workpieces exiting the vessel based on the exit signal comprises:
   defining signal from pixels of the plurality of pixels as either empty signal corresponding to a portion of the exit not including a workpiece or workpiece signal corresponding to a portion of the exit including a workpiece based on a greyscale threshold;
   summing an area of the exit occupied by workpieces based on the workpiece signal; and
   dividing the area of the exit occupied by workpieces by an average workpiece area to provide an average workpiece number.

8. The system of claim 7, wherein the second counting sensor further comprises:
   an exit sensor configured to generate batch signal when a last workpiece of the number of workpieces exits the exit; and a chute sensor configured to generate a chute exit signal when a workpiece exits a chute positioned to receive workpieces from the exit;

wherein the imaging device is a line scan camera positioned to image workpieces on the chute, and wherein the controller further includes circuitry that, when executed by the controller, causes the system to perform operations including:

generating, with the line scan camera, a plurality of line scan images starting upon receipt of the chute exit signal and ending upon receipt of the batch signal; and compiling the plurality of line scan images to provide the exit signal.

9. The system of claim 7, wherein the imaging device is a first imaging device positioned to image the exit and a chute positioned to receive workpieces from the exit, and wherein the second counting sensor further comprises a second imaging device positioned to image a chute exit, and wherein the controller further includes circuitry that, when executed by the controller, causes the system to perform operations including:

generating a first image, with the first imaging device, of workpieces in the chute; and generating a second image, with the second imaging device, of workpieces in the chute exit; and combining the first image and the second image to provide a combined image.

10. The system of claim 9, wherein counting, with the second counting sensor, a number of workpieces exiting the vessel based on the exit signal comprises counting a number workpieces in the combined image.

11. The system of claim 1, wherein the one or more conditions of the system comprises a temperature of the working fluid of the system.

12. The system of claim 11, wherein the controller further includes circuitry that, when executed by the controller, causes the system to perform operations including modulating one or more operations of the system when the temperature of the working fluid lies outside a predetermined range.

13. The system of claim 1, wherein the one or more conditions of the system comprises a temperature of a workpiece.

14. The system of claim 13, wherein the controller further includes circuitry that, when executed by the controller, causes the system to perform operations including modulating one or more operations of the system when the temperature of the workpiece lies outside a predetermined range.

15. The system of claim 1, further comprising a source of an antimicrobial in fluid communication with the interior of the vessel, wherein the controller further includes circuitry that, when executed by the controller, causes the system to perform operations including modulating flow of the antimicrobial into the vessel based on the dwell time or the density of workpieces in the vessel.

16. A method of operating a system, the method comprising:

counting, with a first counting sensor, a number of workpieces entering a vessel configured to carry a working fluid and a plurality of workpieces at least partially submerged in the working fluid;

counting, with a second counting sensor, a number of workpieces exiting the vessel;

calculating a dwell time or density of workpieces in the vessel; and modulating one or more conditions of the system based on the dwell time or the density of workpieces in the vessel.

17. The method of claim 16, wherein modulating the one or more conditions of the system is selected from a group consisting of (1) modulating operation of a delivery train of the system configured to introduce workpieces into the vessel, (2) modulating operation of a transport train of the system configured to transport workpieces introduced into the vessel to an exit of the vessel, (3) modulating operation of a removal train of the system configured to remove workpieces from the vessel through the exit, (4) modulating an amount of the working fluid within the vessel, (5) modulating a flow of chilled water to the vessel, (6) modulating a flow of municipal water to the vessel, (7) modulating a flow of an antimicrobial to the vessel, (8) modulating a temperature of the working fluid within the vessel, and (9) modulating a pH of the working fluid within the vessel.

18. The method of claim 16, wherein the one or more conditions of the system is selected from a group consisting of a rate of workpiece delivery to the vessel, a rate of workpiece exit from the vessel, a temperature of the working fluid within the vessel, a temperature of a workpiece, a volume of the working fluid within the vessel, a pH of the working fluid within the vessel, a flow of water into the vessel, a number of workpieces within the vessel, a fat content of a workpiece, a fat content of the working fluid, an organic load of a workpiece, an organic load of the working fluid, an amount of an organic material in the working fluid, a turbidity of the working fluid, an amount of an antimicrobial in the working fluid, a bacteria count of a workpiece, a bacteria count of the working fluid, a moisture content of a workpiece, a flow of water out of the vessel, a flow of working fluid out of the vessel, and any combination thereof.

19. The method of claim 16, wherein the dwell time is based on an average or a measured time a workpiece is in the vessel.

20. The method of claim 16, wherein the density of workpieces is based on an average or a measured number of workpieces in the vessel and a volume of the vessel.

* * * * *

UNITED STATES PATENT AND TRADEMARK OFFICE
CERTIFICATE OF CORRECTION

PATENT NO. : 12,167,734 B2
APPLICATION NO. : 17/831241
DATED : December 17, 2024
INVENTOR(S) : Mark Bramlett et al.

Page 1 of 1

It is certified that error appears in the above-identified patent and that said Letters Patent is hereby corrected as shown below:

In the Claims

| Column | Line | |
|--------|------|---|
| 18 | 15 | Claim 4, delete "claim 1" and insert -- claim 1, -- |
| 19 | 32 | Claim 10, delete "workpieces" and insert -- of workpieces -- |

Signed and Sealed this
Twenty-ninth Day of July, 2025

Coke Morgan Stewart
*Acting Director of the United States Patent and Trademark Office*